(12) United States Patent
Zhun

(10) Patent No.: US 7,894,405 B2
(45) Date of Patent: Feb. 22, 2011

(54) METHOD TO ACHIEVE FAST ACTIVE SCAN IN 802.11 WLAN

(75) Inventor: Zhong Zhun, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1414 days.

(21) Appl. No.: 10/564,654

(22) PCT Filed: Jul. 13, 2004

(86) PCT No.: PCT/IB2004/051211
§ 371 (c)(1),
(2), (4) Date: Jan. 13, 2006

(87) PCT Pub. No.: WO2005/006785
PCT Pub. Date: Jan. 20, 2005

(65) Prior Publication Data
US 2006/0159041 A1  Jul. 20, 2006

Related U.S. Application Data

(60) Provisional application No. 60/487,423, filed on Jul. 15, 2003, provisional application No. 60/541,870, filed on Feb. 4, 2004.

(51) Int. Cl.
*H04W 4/00* (2009.01)
*H04B 7/212* (2006.01)
*H04J 3/24* (2006.01)
*H04L 12/413* (2006.01)

(52) U.S. Cl. ............... 370/338; 370/328; 370/331; 370/347; 370/349; 370/447

(58) Field of Classification Search ............... 455/24, 455/41.2, 435.1–435.3, 434, 450–451, 452.1–452.2, 455/455, 464, 466, 509–517, 524–525, 550.1, 455/556.2, 561, 432.3, 436–437, 453; 370/328–329, 370/341–343, 345, 349–350, 442–448, 450, 370/458–459, 461, 463, 395.65, 901, 908, 370/913, 915, 312, 338, 331–332, 336–337, 370/346–347, 441, 462; 367/118–129, 138

See application file for complete search history.

(56) References Cited

U.S. PATENT DOCUMENTS 6,587,680 B1 * 7/2003 Ala-Laurila et al. ......... 455/411

(Continued)

OTHER PUBLICATIONS

"Fast Active Scan for Measurement and Handoff", by Moo Ryong Jeong et al., pp. 1-22.

(Continued)

*Primary Examiner*—Meless N Zewdu
(74) *Attorney, Agent, or Firm*—Larry Liberchuk

(57) ABSTRACT

A method for fast active scanning and an Access Point apparatus that reduces the delay in convention active scanning. The method includes the step of giving an AP higher priority to transmit a probe response than is currently known. This priority comes at the delay of transmission of the probe response, so preferably the probe response can be delayed by just the time that the AP needs to prepare the response plus the time, if any, for the frame already in the air to finish. According to the invention, a method can include steps for: sending a uni-cast probe request message by an (STA) 238, 248, 268 on a particular channel having at least one Access Point (AP) 258, 278 in communication therewith; receiving by one particular (AP) 278 the probe request message sent by the (STA); sensing by the particular (AP) 278 of a point coordination function (PCF) interframe space (PIFS) 325 of the particular channel; and sending by the particular (AP) 278 of a probe response message to the (STA) 238 in response to the probe request message after the PIFS. As the probe request is uni-cast, there is no need for a backoff interval as only one AP will respond. Since normal traffic utilizes the longer DIFS space plus backoffs to avoid collisions, the AP will always be able to respond to a probe request of scan faster than other items can respond on the channel, thus giving the AP priority when sending the probe response message.

21 Claims, 5 Drawing Sheets

U.S. PATENT DOCUMENTS

| | | | |
|---|---|---|---|
| 6,990,116 B1 * | 1/2006 | Young et al. | 370/445 |
| 7,028,186 B1 * | 4/2006 | Stenman et al. | 713/173 |
| 7,031,336 B2 * | 4/2006 | Scherzer et al. | 370/461 |
| 7,054,329 B2 * | 5/2006 | Cervello et al. | 370/447 |
| 7,151,945 B2 * | 12/2006 | Myles et al. | 455/502 |
| 7,280,517 B2 * | 10/2007 | Benveniste | 370/338 |
| 2002/0197979 A1 * | 12/2002 | Vanderveen | 455/410 |
| 2006/0111103 A1 * | 5/2006 | Jeong et al. | 455/434 |

PUBLICATIONS

"IEEE P802.11 Wireless LANs Proposed Text for Fast Active Scan", by Moo Ryong Jeong et al., pp. 1-5.

* cited by examiner

METHOD TO ACHIEVE FAST ACTIVE SCAN IN 802.11 WLAN

CROSS REFERENCE TO RELATED APPLICATION

This application claims the benefit of U.S. provisional application Ser. No. 60/487,423 filed Jul. 15, 2003 and U.S. provisional application Ser. No. 60/541,870 filed Feb. 4, 2004 both of which are incorporated herein in whole by reference.

The present invention relates to wireless local area networks using the IEEE 802.11 protocol. More particularly, the present invention relates to the procedure that occurs when a device is handed off from a first access point until a new link is established with a second access point.

The 802.11 WLAN supports two types of networks, the Infrastructure Basic Service Set (BSS) and the Independent Basic Service Set (IBSS). The BSS is the basic building block of a WLAN and can be defined as a set of stations that communicate with each other, typically through the coordination of an Access Point (AP). Accordingly, each BSS consists of at least two stations (STAs) and an Access Point (AP).

The operational mode for the BSS is referred to as infrastructure mode, wherein there is at least one AP and one STA, with the AP and the one or multiple STAs it supports being known as the Basic Service Set. The STAs use the AP to access the resources of the wired network, as well as to communicate with the other STA's within the same BSS. The wired network may comprise an organization intranet or the Internet, depending on the placement of the AP. With regard to IBSS, the wireless stations STAs communicate in a peer-to-peer network without the use of the AP or Distributed System (DS) in what is referred to as a peer-to-peer mode. Alternatively, this mode is also referred to in the art as "an ad-hoc mode." Two or more wireless STAs that communicate using ad-hoc mode form an IBSS.

In the BSS network, a set of two or more BSSs that are connected by the distributed system (DS) is known as an Extended Service Set (ESS), and identified by its Service Set Identifier. If the radio coverage area of the APs overlap, then an STA can roam, or move from one location (within the BSS of one AP) to another (within the BSS of a different AP), while maintaining network layer connectivity. This process is referred to as a "handoff."

During the handoff procedure, a communication disruption period occurs starting from the time the existing communication link is broken until the time when the new link is established. The communication disruption period is comprised of a scanning process, during which the STA searches for other APs in the neighborhood, and an ongoing process, during which the STA authenticates and re-associates with the new AP that the STA found in the scanning process. In the current state-of-the-art, the communication disruption period is dominated by the scanning portion, with the time required for authentication and re-association resulting in just a fraction of the total communication disruption period.

In IEEE 802.11 a STA can do two types of scanning: passive scanning and active scanning.

For passive scanning, an STA simply goes to the channel of interest and passively listens for the periodic beacons sent out by the AP (if any).

For active scanning, the STA sends a broadcast probe request and waits a predetermined period of time to determine whether any "probe response(s)" has (have) been transmitted by the AP(s) in response to the probe request. On average, active scanning can get the result faster than passive scanning.

For active scanning, STA usually doesn't wait for more than 20 ms (for the predetermined time period) in one channel, whereas for passive scanning, the STA needs to stay up to the beacon interval (e.g. 100 ms) to guarantee to receive the beacon.

According to the current IEEE 802.11 standard, the APs follow what are referred to as "medium access rules." Conventionally, when an STA is performing active scanning it first sends a probe request to a first channel and waits for an AP to reply with a probe response on that first channel. The faster that the STA gets the probe response back from the AP, the less time that the STA spends on scanning each particular channel. Conventionally, the AP follows the same medium access rules for probe response as any other STA does for normal data frames.

The probe request that is sent by the STA is typically a broadcast message, meaning that the STA is unaware of all the APs on a particular channel that might receive such a request. An added problem is that if multiple APs were to respond at the same time, collisions would render the transmitted data to be meaningless. Thus, the standard has developed protocols (medium access rules) to prevent these catastrophic collisions from occurring.

FIG. 1 depicts how the medium access rule operates. An STA wanting to transmit a frame first senses the medium for a distributed coordination function (DCF) interframe space (DIFS) time period 100. If the medium remains idle during the DIFS period, the STA then picks a backoff interval in the range of (0, CW), where CW denotes a Contention Window 110. The initial CW is set to be a preset minimum contention window size CWmin, and doubled each time a retransmission occurs, until it reaches the preset maximum contention window size CWmax. For each time slot 120 during which the medium remains idle, the STA decreases the backoff interval by one. The STA begins transmission when the backoff interval reaches 0.

However, as the AP uses the same medium access rule to transmit the probe responses as do other STAs, which use the rule to transmit normal data packets, the probe response transmission can be delayed by the data transmissions from the other STAs. Depending on the number of STAs in the BSS and the traffic load, the delay can be quite large.

FIG. 2A is a timing diagram showing how under the current protocol the probe response is delayed by data transmissions in contending for the medium. In the upper left hand corner of the diagram item 210 shows the probe request made by a scanning station. In the lower right hand corner of the drawing is the actual probe response 275 from the AP, followed by the Acknowledgement (ACK 280) by the scanning station. In between is the delay that may typically occur as other STAs are serviced (at 220-250) before the probe response is transmitted by the AP and received by the particular STA, because the other STAs are transmitting normal data packets. All of these items have a same level of priority according to the current protocol.

If the STA has prior knowledge of the identification of an AP of interest, then the STA can send a uni-cast request to the target AP rather than a broadcast probe request. In the case of a uni-cast message, the possibility of multiple APs responding to the same request is eliminated. Therefore, there is no need to consider contention/collision among a plurality of APs all sending the probe response to the same STA at the same time.

However, in the case where the STA does not have prior knowledge of the identification of a particular AP of interest, there can be contention among multiple APs attempting to send the probe response to the same STA at the same time.

One of the reasons that the current protocol uses the normal DCF for a probe response transmission is to resolve the contention among multiple APs sending probe responses to the same probing STA. A major distinction between wireless and wired protocols is that collision detection and avoidance is much more difficult to detect in the management of data collisions on wireless media transmissions. Without any knowledge about the possible APs around, the STA sends the probe response using a broadcast address so that any AP receiving the request can respond with the probe response. To avoid collision when multiple APs respond to a request at the same time, the DCF rule with the contention window and backoff interval is used.

FIG. 2B illustrates a group of wireless nodes. Nodes 1 and 2 (238, 248) can hear each other and the AP 258. Similarly Nodes 2 and 3 (248, 268) can hear also hear each other and the AP 258. The problem arises when nodes 1 and 3 (238, 268) try to transmit simultaneously. In this instance, data collisions from nodes 1 and 3 (238, 268) will corrupt at least a portion (if not all) of the data transmissions from both nodes. The DCF avoidance collision function senses the medium to detect whether or not it is in use prior to transmission. If the medium is unused, the transmission will occur without delay. However, if it is sensed that the media is use by another wireless STA, the STA wishing to transmit will wait an amount of time according to an algorithm before attempting a transmission. The sensing of the medium availability is known in the art as clear channel assessment.

In 802.11, the DCF requires an acknowledgement (ACK) frame to indicate that the transmission of certain frames were successful. A timer function indicates how long one should wait for an ACK, wherein times exceeding this timeframe are assumed to be erroneous. DCFs are also known for providing frame interval timers based on PHY-specific values. Such timers sense that the medium is idle prior to beginning transmission. Two other types of intervals that serve for other frame intervals are the Slot time and the SIFS (Short Interframe Space) time. The SIFS is the shortest of the frame interval spaces and permits an already in progress transmission to finish. The slot time can be defined as the sum of the receive transmit turnaround time and the energy detect time. The SIFS for the DSSS PHY is 10 microseconds, and 28 microseconds for the FHSS PHY, SIFS and slot time can be used as components in other intervals, such as DIFS (Distribution Interface Frame), EIFS (extended interframe space), and PCF interframe space (PIFS). The DCF uses DIFS to enable transmission of data, whereas the EIFS enables process of frames that are reported as erroneous.

In summary, there are drawbacks to scanning in its present form, whether it is active or passive. Even with active scanning, the channel scanning process can take up to several hundred milliseconds in a worst case scenario, wherein the STA has to scan all of the possible channels. Once the scanning has been performed the second process, (the STA authenticating and re-associating with the new AP found in the scanning process) that must be performed by the STA takes only tens of milliseconds to complete. By comparison, this time is significantly less than the lion's share of the time used by the scanning period. Thus, there is a need in the art for a method to provide fast active scanning that is heretofore unknown.

The present invention provides a method for fast active scanning that reduces the delay in convention active scanning. The method includes the step of giving an AP higher priority to transmit a probe response than is currently known. The present invention takes advantage of the attribute of the PIFS in that it enables a station to have priority access to the medium. According to the present invention, the probe response only needs to be delayed by the time the AP needs to prepare to respond plus the time for the frame, if any, already in the air to finish when the AP is ready to transmit the probe response. Any other data frames not sent before the AP is ready to transmit the probe response will not cause any further delay in the probe response.

In particular, with the uni-cast probe request, the medium access rule for the probe response can be changed to reduce the delay in active scanning. The higher priority reduces the delay of a transmission of the probe response by the AP, so preferably the probe response can be delayed by only the time that the AP needs to prepare the response plus the time, if any, for the frame already in the air to finish. The present invention is also advantageous in that it can be implemented without increasing the complexity of the hardware of either the STAs or the AP.

Figure 1:
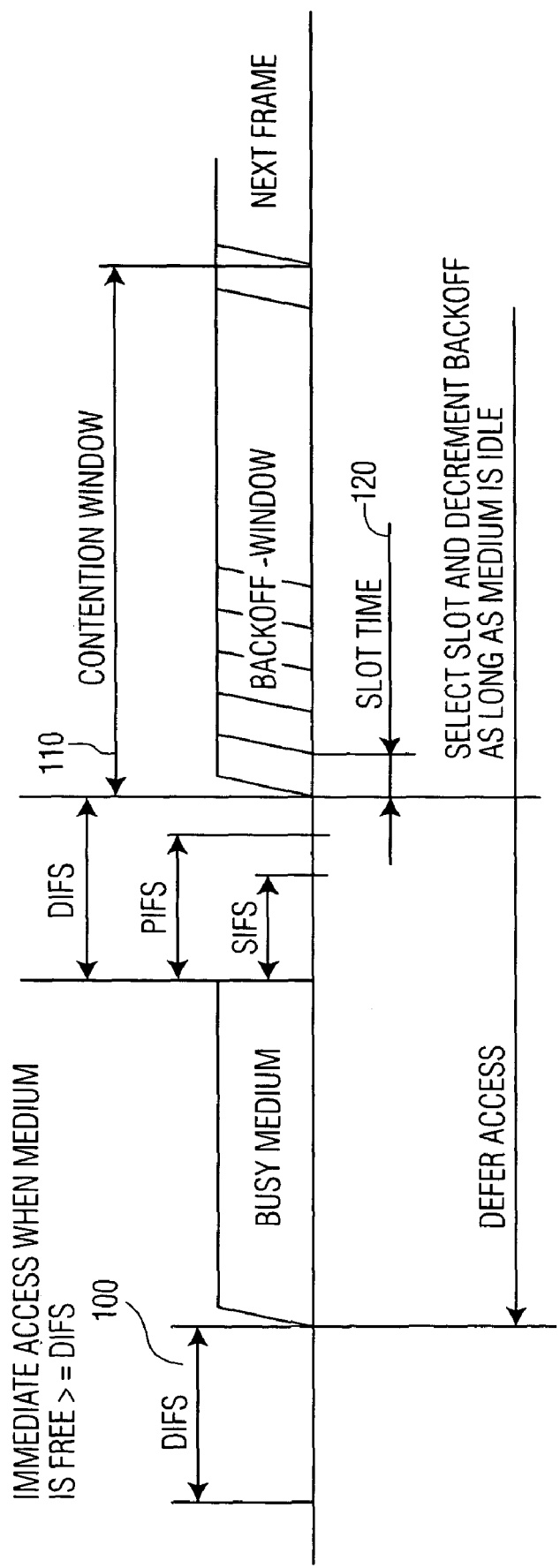
FIG. 1 is depicts how the medium access rule operates in a conventional wireless environment.

It is to be understood that the following descriptions, which are presented in conjunction with the drawings, are provided for purposes of illustration, not for limitation. A person of ordinary skill in the art will appreciate that there are many variations of the present invention that lie not only within the spirit of the invention but also within the scope of the appended claims. For example, the number and type of stations, the many types of Access Points, and the types of transmission between the two. It is even possible that messages other than probe request messages could receive priority according to this invention, and such is within the spirit of the invention and the scope of the appended claims which refers to probe request units, sensing units and response during PIFS as being illustrative rather than limitative of the types of messages that could be given priority according to the present invention. Finally, items such as acknowledgements (ACKS) are at times not included in discussions herein below and in the appended claims so as not to obscure the invention with unnecessary detail. However, such steps are recognized as being required depending on the protocol used. While 802.11 is the preferred WLAN protocol, the present invention should not be limited to only such a system.

According to the present invention, the AP is permitted to take its time to prepare the probe response similar to the current implementation. However, unlike the prior art, the AP is permitted to transmit the probe response as soon as the AP is ready, so as long as the AP has sensed that the medium is idle for the Point Inter-frame Space (PIFS).

The AP sends the probe response using PIFS interframe space without a backoff interval. One reason that a backoff interval is not required is that the STA sends a uni-cast message to a particular AP on the channel, and only that particular AP will respond to uni-cast message, even if there are other APs available on the channel. A second reason that the AP is able to transmit without a backoff interval is because the AP is the only one transmitting during the PIFS interframe space, thus eliminating the possibility of collisions. Ordinary data traffic waits for a DIFS interval, which is longer than the PIFS interval. Thus, the AP is able to provide priority to the STA scanning over other STA transmissions. As the STA can be mobile and moving toward the outer ranges of its current association with an AP, providing priority during an active scan reduces the chances that the STA will move out of range of the current AP before being handed-off, resulting in a dropped/disconnected communication. There are also instances where an AP may select a certain STA for disconnection, and the priority helps increase the possibility that the STA will be handed-off rather than dropped.

PIFS is used by the PCF (Point Coordination Function) to obtain exclusive access to the wireless medium after the medium is determined to be idle. One part of the medium access rule is that the PIFS can be used for some management and control messages, such as polling frames. Using PIFS, the AP will always win contention with other STAs trying to transmit data frames using DIFS and a backoff interval.

Figure 2A:
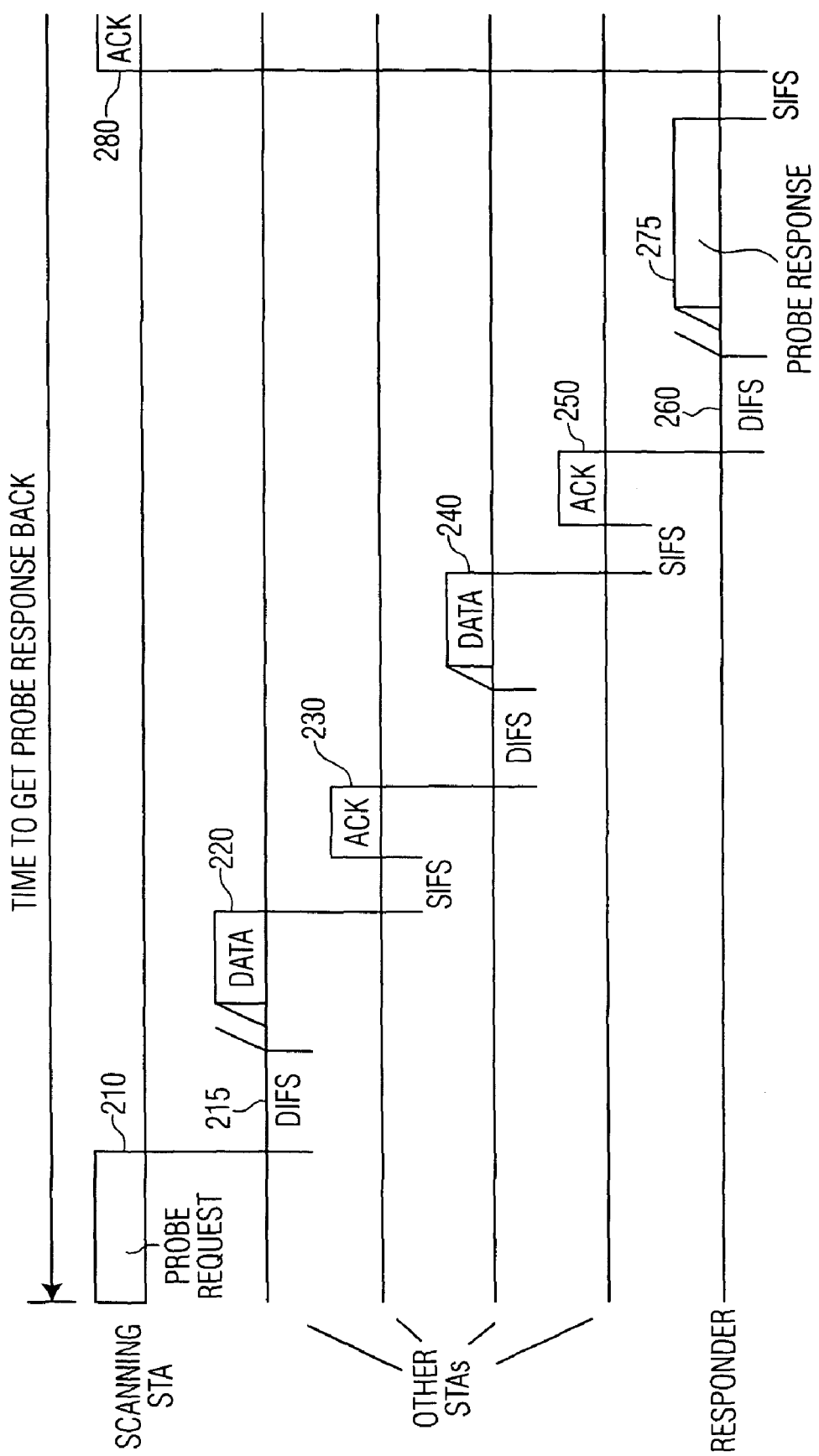
FIG. 2A is a timing diagram showing the probe response under the current protocol.
Figure 2B:
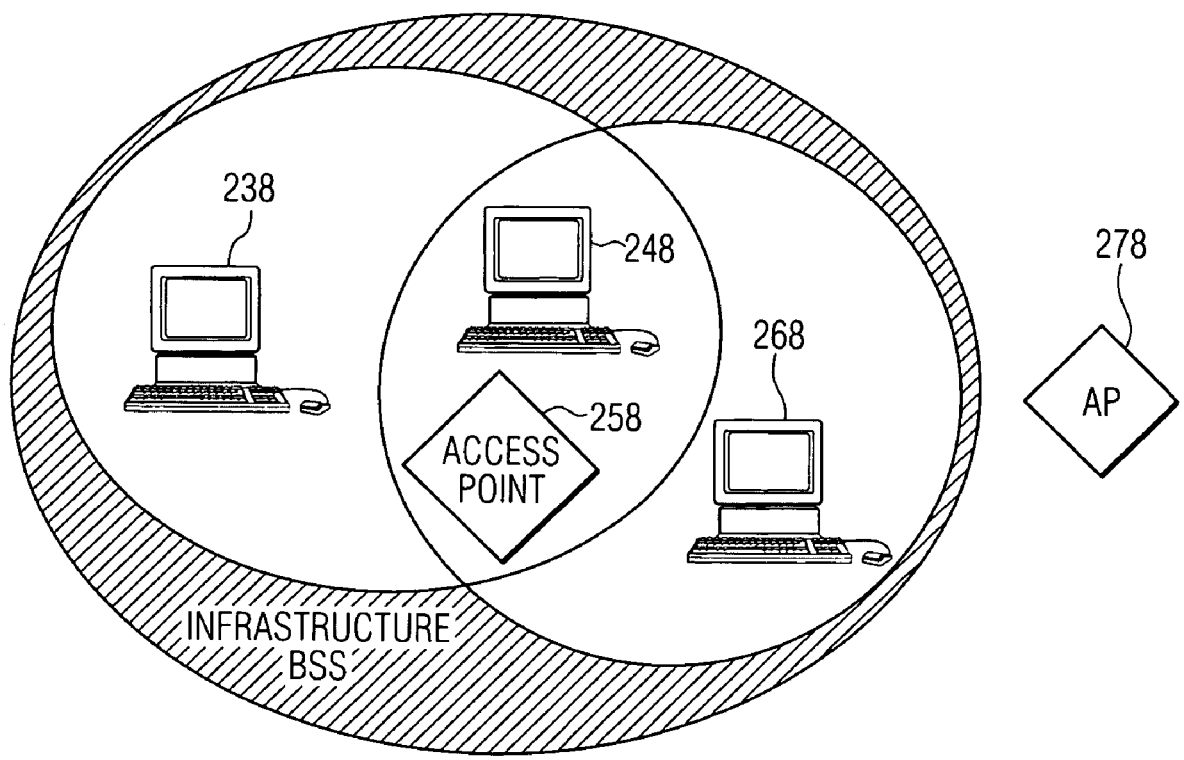
FIG. 2B illustrates a group of wireless nodes arranged to explain the collision avoidance function implemented by the Distributed Coordination Function.
Figure 3:
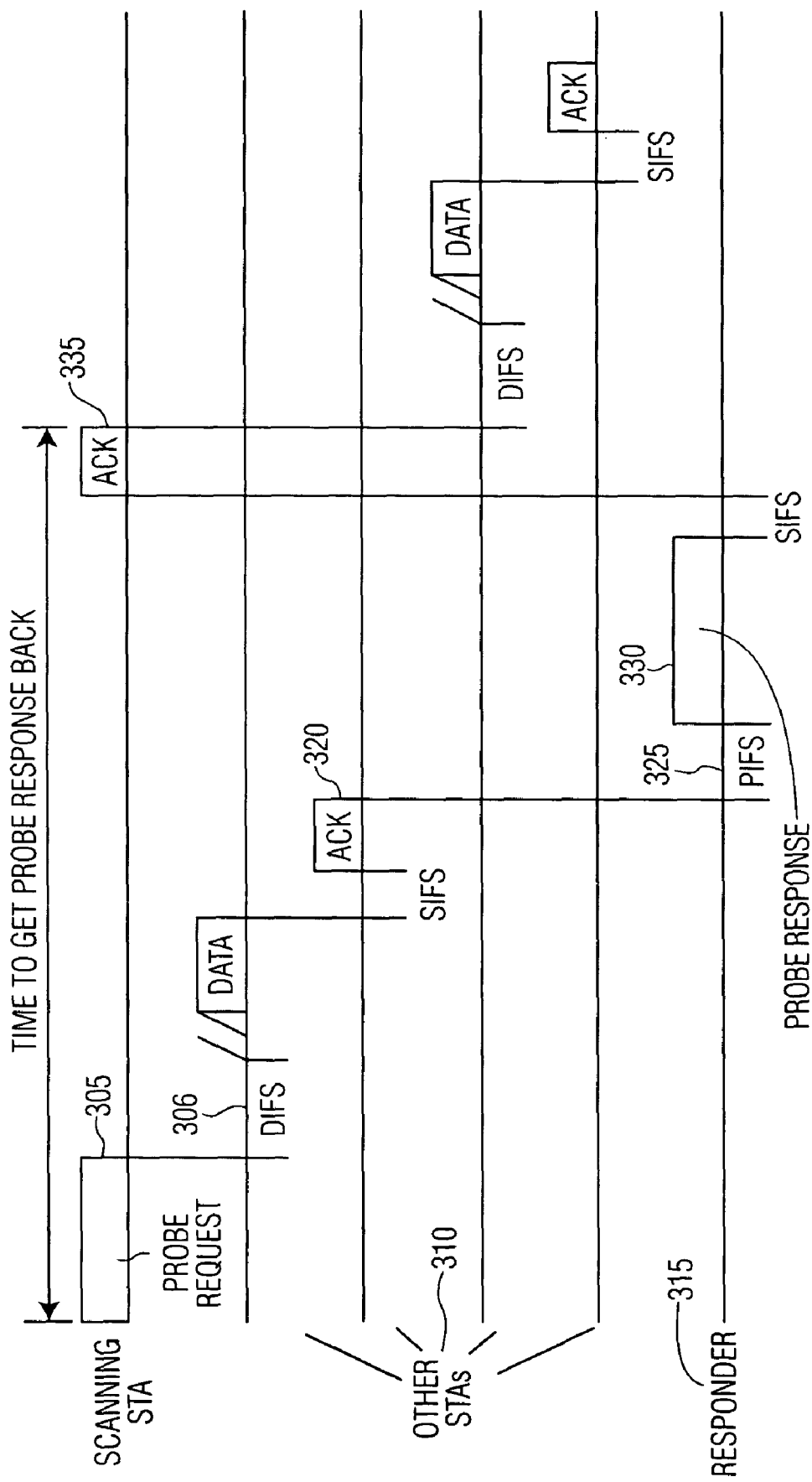
FIG. 3 illustrates the shortened response time when following the method according to the present invention.

FIG. 3 illustrates the shorter delay using the method of the presently claimed invention than conventional methods. Here, it is shown at 305 that the scanning STA sends a probe request in the normal fashion as shown in FIG. 2A. After the probe request is sent. FIG. 3 shows other STAs 310 is transmitting data packets, etc., in the usual way as shown in FIG. 2A.

However, the difference becomes clear when the AP is ready to return a probe response. By the time the responder AP is ready to supply a probe response, there already is a data frame being transmitted by another STA, as evidenced by the ACK response 320 by one of the other STAs.

Instead of merely waiting its turn because of equal priority, the AP gains channel access using PIFS 325 right after the previous transmission (data and ACK) finish and sends the probe response 330 to the scanning STA that sent the probe request 305. Assuming that the time needed for the AP to prepare a probe response is no more than one data frame exchange, the illustration in FIG. 3 is the maximum delay that a probe response can experience.

In other words, according to the present invention, instead of waiting for DIFS time period, meaning an interframe space time period and using a backoff algorithm to remove any content with other devices, the AP of the present invention is able to send a probe response starting at the end of the PCF interframe space called PIFS.

Although using SIFS (Short Inter-frame Space time) will give the AP even higher priority to send the probe response, its application may not be practical. If the SIFS is immediately following the probe request, this require that the AP have the probe response ready with SIFS time after it receives the probe request, at the present time all APs are not capable to do. If the SIFS is following some other transmission of the other STAs, the probe response may collide with the acknowledgement frame corresponding to the previous transmission, which also uses SIFS. To avoid collisions, a backoff interval would need to be introduced that might slow down functions that are using the SIFS for transmission. Therefore, we choose PIFS, the next shortest inter-frame space time for AP to send probe response.

Figure 4:
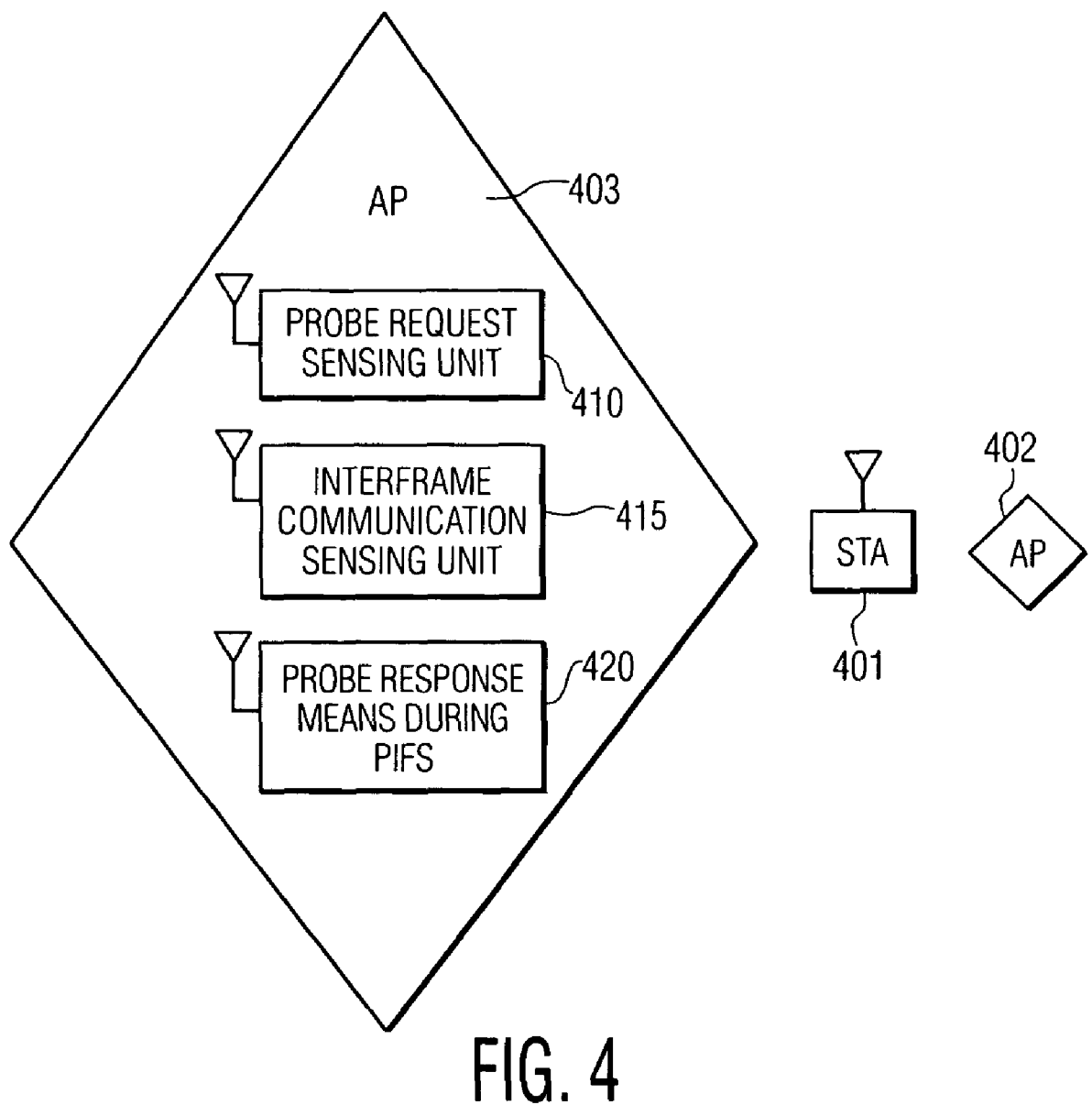
FIG. 4 shows one possible example of how an Access Point according to the present invention can be structured to allow priority to a scanning STA over other stations.

FIG. 4 is an example of the configuration of an Access Point according to the present invention. It is to be understood by persons of ordinary skill in the art that there are many ways to cause the Access Point to give priority to the scanning station STA. It is also noted that the units or modules may comprise hardware, software, firmware, or any combination thereof to perform the present invention. Also, some of the hardware/software/firmware used for sensing and transmitting may already exist in an AP, but it is has not been programmed or setup to allow priority to a scanning STA probe request by responding during the PIFS rather than the DIFS after receipt of a probe request message.

According to FIG. 4, STA 401 is originally controlled by Access Point 402. The station, as it may be mobile, needs to be handed-off to a new Access Point 403 that may be more advantageously situated, either by its location being more proximal to the STA 401 or because there will be fewer content issues as the (AP) 403 may not have as many STAs within its range.

The (AP) 403 will comprise hardware, software, and/or firmware modules that include a probe request sensing unit 410, an interframe communication sensing unit 415, and a probe response after a PIFS unit. These units/modules may be part of a larger unit or unit that, for example, already carries out MAC (medium access control) protocols under, for example, 802.11.

Upon sensing the probe request by the probe request sensing unit 410, the AP 403 will prepare a probe response message, which can be prepared in the conventional fashion and timeframe. The interframe communication sensing unit 415 will monitor the channel for an interframe space, in this particular case a PIFS 325 and as soon as it is sensed, the probe response means 420 will transmit the response. It is to be noted that the (AP) 403 is not required to utilize a backoff window and/or algorithm countdown prior to transmitting probe response. If there were other contention issues, however, such a backoff mechanism could be utilized. Such a back-off mechanism would operate similarly to those that resolve contention when using DIFS interframe spaces.

There are several scenarios (variations) of the claimed invention that may occur if a predetermined time period passes without receiving a probe response after the PIFS. First, the STA may simply retry the uni-cast message to the same AP. Second, the STA may send a uni-cast message to another AP on the same channel. Third, the STA may send a uni-cast message to another AP on a different channel. Fourth, the STA may broadcast the probe request message on the same channel. Fifth, the STA may broadcast the probe request message on a different channel. In the cases where the "retry" is a uni-cast message, the predetermined time period used by the STA can be slight larger than a PIFS timeframe, as opposed to the 20 ms that an STA typically waits now before timing out. A person of ordinary skill in the art understands that the predetermined time frame can be altered so that a number of timeouts per given response time is minimized without degrading overall system response. Once the probe response message is received and acknowledged by the STA, the rest of the process of handing-off to the (AP) 403 can continue. It is noted that considerable time has been saved by the present invention's scanning method, as the STA required to be handed-off is expected to receive the probe response from the AP faster, thanks to the higher priority the AP uses to send the probe response over the normal transmissions of data packets.

Therefore, the presently claimed invention allows a priority system to service the STAs needed to be handed off without any major overhaul to the current protocol and hardware of stations and Access Points that comprise most WLANs.

What is claimed is:

1. A method for fast active scanning on a wireless local area network (WLAN) between a mobile station (STA) and at least one Access Point (AP) comprising:

sending a probe request message by an STA over a particular channel having a particular Access Point in communication with the STA;

receiving by the particular Access Point the probe request message sent by the STA;

sensing by the particular Access Point a point coordination function interframe space (PIFS) of the particular channel; and sending by the particular Access Point a probe response message to the STA in response to the probe request message after the PIFS without the particular Access Point performing a backoff interval.

2. The method according to claim 1, wherein the probe request message is a uni-cast message to the particular Access Point.

3. The method according to claim 2, wherein only the particular Access Point transmits after the PIFS interframe in response to receiving the uni-cast probe request message from the STA.

4. The method according to claim 1, wherein if the STA does not receive the probe response message within a predetermined time period, the STA senses a distributed coordination function interframe space period (DIFS) interframe space, wherein the STA selects and implements a backoff interval prior to broadcasting the probe request message on the particular channel to all available Access Points.

5. The method according to claim 4, wherein said backoff interval having a range of (0, CW), where CW denotes a Contention Window.

6. The method according to claim 1, wherein if the STA does not receive the probe response message within a predetermined time period, the STA senses a distributed coordination function interframe space period (DIFS) interframe space, wherein the STA selects and implements a backoff interval prior to broadcasting the probe request message on a channel different than the particular channel.

7. The method according to claim 1, wherein if the STA does not receive the probe response message within a predetermined time period, the STA selects another Access Point on the particular channel and senses a distributed coordination function interframe space period (DIFS) interframe space, wherein the STA selects and implements a backoff interval prior to sending another probe request message that comprises a uni-cast message.

8. The method according to claim 1, wherein if the STA does not receive the probe response message within a predetermined time period, the STA selects another Access Point on a different channel and senses a distributed coordination function interframe space period (DIFS) interframe space, wherein the STA selects and implements a backoff interval prior to sending another probe request message that is a uni-cast message.

9. The method according to claim 1, further comprising:
acknowledging receipt of the probe response message by the STA in response to the probe request message; and
continuing a hand-off function by the STA with the particular Access Point.

10. A method for fast active scanning in a wireless local area network (WLAN) between a mobile station (STA) and at least one Access Point (AP) comprising:
sending a probe request message comprising a uni-cast message by an STA on the particular channel having at least one Access Point in communication with the STA;
receiving by a particular Access Point the probe request message sent by the STA;
preparing a probe response message by the particular Access Point;
sensing by the particular Access Point a point coordination function interframe space (PIFS) of the particular channel; and sending by the particular Access Point a probe response message to the STA in response to the probe request message without the particular Access Point performing a backoff interval.

11. The method according to claim 10, wherein if a predetermined time period passes without a response from the particular Access Point, after sensing a distributed coordination function interframe space period (DIFS) interframe space, the STA selects and implements a backoff interval prior to broadcasting a probe request message on the particular channel.

12. A method for providing handoffs by fast active scanning on a wireless local area network (WLAN) between a mobile station associated with a first Access Point to a new Access Point, said method comprising:
sensing, by the mobile station, for a distributed coordination function interframe space period (DIFS) of a particular channel;
sending a probe request message by the mobile station throughout the particular channel having at least one new Access Point;
receiving by said at least one new Access Point the probe request message sent by the mobile station;
preparing a probe response message by the new Access Point;
sensing by the new Access Point a point coordination function interframe space (PIFS) of the particular channel;
sending by said new Access Point a probe response message to the mobile station in response to the probe request message without performing a backoff interval; and
said the mobile station authenticating and re-associating with said new Access Point, followed by the mobile station being handed-off to said new Access Point.

13. An Access Point in a wireless local network (WLAN) that provides priority to facilitate a handoff of a station between one or more Access Points, comprising:
a probe request sensing unit sensing when a probe request message has been sent on a particular communication channel;
an interframe communication sensing unit sensing a point coordination interframe space (PIFS) on the particular communication channel; and
probe response sending means sending the probe response message after the PIFS sensed by the interframe communication sensing unit without performing a backoff interval.

14. The Access Point according to claim 13, wherein the interframe communication sensing unit and the probe response means sense a distributed coordination function (DCF) interframe space period (DIFS) of a particular channel and respond to probe requests with non-unicast destination addresses after the DIFS and backoff interval.

15. A fast active scanning system on a wireless local area network between a first station and at least one second station comprising:
a first station sending a probe request message over a particular channel having a particular second station in communication with the first station;
means for receiving by said particular second station the probe request message sent by the first station, said means includes sensing by said particular second station a point coordination function interframe space of the particular channel; and
said particular second station sending a probe response message to the first station in response to the probe request message after the point coordination function interframe space is sensed without performing a backoff interval.

16. The system according to claim 15, wherein the probe request message sent by the first station comprises a uni-cast message to the particular second station.

17. The system according to claim 15, wherein if the probe response message from the particular second station is not received within a predetermined time period, the first station senses a distributed coordination function interframe space period, and the first station selects and implements a backoff interval prior to broadcasting a probe request message on the particular channel to all available second stations.

18. The system according to claim 15, wherein if the first station does not receive the probe response message from the particular second station within a predetermined time period, the first station senses a distributed coordination function interframe space period, and the first station selects and implements a backoff interval prior to broadcasting a probe request message on a channel different than the particular channel.

19. The system according to claim 15, wherein if the first station does not receive the probe response message from the particular second station within a predetermined time period, the first station selects another second station on the particular channel and senses a distributed coordination function interframe space period, and the first station selects and implements a backoff interval prior to sending another probe request message that comprises a uni-cast message.

20. A first station in a wireless local area network that provides priority to facilitate a handoff between one or more second stations, comprising:
- a probe request sensing unit sensing when a probe request message has been sent on a particular communication channel;
- an interframe communication sensing unit sensing a point coordination interframe space on the particular communication channel; and
- probe response sending means for sending a probe response message after the point coordination function interframe space sensed by the interframe communication sensing unit without performing a backoff interval.

21. The first station according to claim 20, wherein the interframe communication sensing unit and the probe response sending means sense a distributed coordination function interframe space period of a particular channel and respond to probe requests with non-unicast destination addresses after the distributed coordination function interframe space period and backoff interval.

* * * * *